United States Patent [19]

Salzman

[11] 4,311,350
[45] Jan. 19, 1982

[54] LUBRICATION SYSTEM FOR A THRUST BEARING

[75] Inventor: Allen W. Salzman, Racine, Wis.

[73] Assignee: Marchem Products Company, Houston, Tex.

[21] Appl. No.: 184,037

[22] Filed: Sep. 4, 1980

[51] Int. Cl.³ .................................................. F16C 17/06
[52] U.S. Cl. ..................................... 308/160; 308/170
[58] Field of Search ............. 308/160, 168, 170, 169, 308/9, 172, 73

[56] References Cited

U.S. PATENT DOCUMENTS

| | | | |
|---|---|---|---|
| 1,400,168 | 12/1921 | Kingsbury | 308/160 |
| 1,836,065 | 12/1931 | Brown | 308/160 |
| 1,905,443 | 4/1933 | Cope et al. | 308/168 |
| 2,507,021 | 5/1950 | Lakey | 308/160 |
| 2,553,107 | 5/1951 | Needs | 308/168 |
| 3,297,371 | 1/1967 | Salzman | 308/73 |
| 3,378,319 | 4/1968 | Cutting et al. | 308/160 |
| 3,454,312 | 7/1969 | Bielec | 308/160 |
| 3,702,719 | 11/1972 | Hoffman | 308/160 |
| 3,708,216 | 1/1973 | Gerling | 308/73 |
| 3,759,588 | 9/1973 | Anderson | 308/9 X |
| 3,893,737 | 7/1975 | Tyson | 308/160 |
| 4,026,613 | 5/1977 | Moravchik | 308/160 |
| 4,077,682 | 3/1978 | Gardner | 308/160 |

FOREIGN PATENT DOCUMENTS

| | | | |
|---|---|---|---|
| 663649 | 10/1938 | Fed. Rep. of Germany | 308/160 |
| 1172483 | 6/1964 | Fed. Rep. of Germany | 308/160 |

*Primary Examiner*—Henry K. Artis
*Attorney, Agent, or Firm*—Arthur J. Hansmann

[57] ABSTRACT

A lubrication system for a thrust bearing which frictionally supports a rotating collar. A plurality of bearing pads are spaced apart around the bearing, and the bearing support ring has threaded openings in the spaces between the pads and nozzles are threaded into the openings. The nozzles have oil passageways which direct oil to the pads and rotating collar for lubricating same. There is only one large oil passageway in each nozzle, so there is no clogging of the nozzles, and the oil passageway outlet can be directed to spray the oil onto the pad where the collar is rotating toward that pad, for optimum lubrication.

6 Claims, 4 Drawing Figures

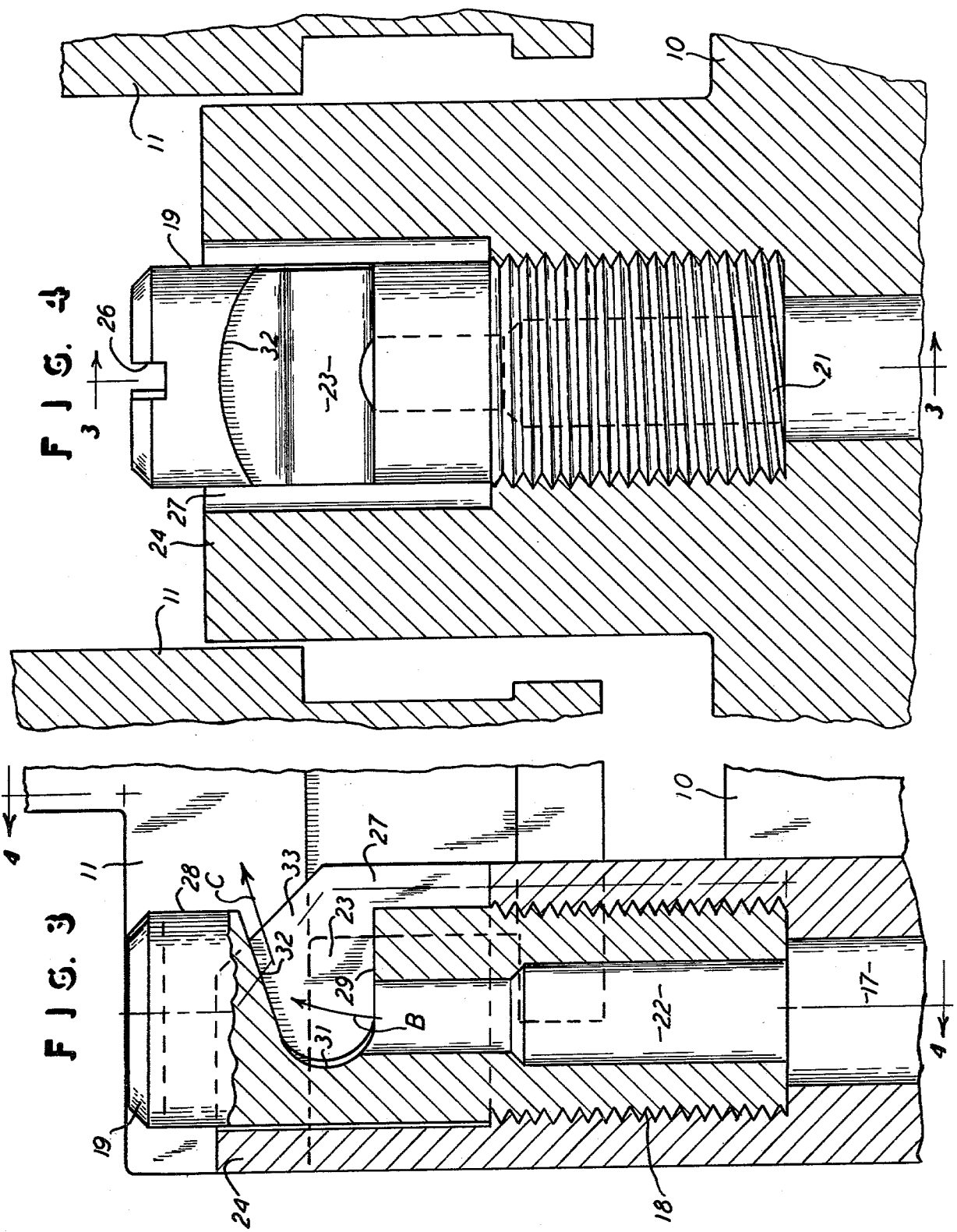

LUBRICATION SYSTEM FOR A THRUST BEARING

This invention relates to a lubrication system for a thrust bearing, and, more particularly, it relates to a system which employs a plurality of nozzles in the bearing ring for directing lubricating oil to the bearing pads and the supported rotating collar.

BACKGROUND OF THE INVENTION

Thrust bearings are commonly known and employed in industry and they utilize a support ring which contains a plurality of spaced-apart pads on which a rotating collar is supported as a part of a rotating shaft of a machine or the like. One example of an early thrust bearing arrangement of the type mentioned is seen in U.S. Pat. No. 1,400,168. The limitation, problem, and concern with the early thrust bearing of the type utilizing a plurality of pads involved adequate lubricating of the frictionally supported rotating collar on the pads. One early attempt to lubricate the thrust bearing of the type mentioned is disclosed in U.S. Pat. No. 1,836,065 wherein piping extends in the bearing itself and has outlets for the discharge of oil into the bearing and thus flood the bearing with oil for lubricating the bearing. Other U.S. Patents which show general arrangements for lubricating bearings are U.S. Pat. Nos. 1,905,443 and 2,507,021 and 2,553,107 and 3,297,371 and 3,708,216. The latter two show a journal type of bearing with an oil inlet and an oil outlet relative to the bearing for flooding same.

With regard to the aforementioned, it was generally recognized that there was still a problem in positioning the oil at the friction surfaces, as desired. Accordingly, the prior art discloses lubricating systems which utilize oil passageways or even nozzles which direct the oil to the location where it is desired. In this regard, U.S. Pat. Nos. 3,378,319 and 3,454,312 and 3,893,737 and 4,026,613 utilize specific oil passageways, and they even utilize nozzles, for directing the oil at the friction surfaces.

With regard to the aforementioned patents and the differences with the present invention, U.S. Pat. No. 3,378,319 does not disclose a nozzle which is threaded into the thrust bearing ring and which has its oil outlet directed at the friction surface between the collar and the pad. The same limitation exists in U.S. Pat. No. 4,026,613. U.S. Pat. Nos. 3,454,312 and 3,893,737 both show a form of a nozzle, but they also show a plurality of a small oil outlet passageways through which the oil is expected to go on its path toward lubricating the bearing. However, in those arrangements, it is a problem that the nozzles with those plurality of small oil outlet passageways become clogged, and thus the proper lubrication of the bearing is impaired or completely interrupted. U.S. Pat. No. 3,893,737 specifically recognizes the problem of nozzle clogging.

Another concern in the art with regard to thrust bearing lubrication is that which is created by centrifugal force produced by the rotating collar and tending to cause the sprayed or injected oil to be thrown radially outwardly and thus be at least partly ineffective in lubricating. This problem is mentioned in the aforementioned patents, and particularly U.S. Pat. No. 2,507,021 and U.S. Pat. No. 3,893,737 mentioned the problem. Of course the centrifugal force problem is greater where the lubricant is dispensed toward the friction surface in a thin stream of oil which is readily subjected to the centrifugal force action and is thus repelled in its path toward the friction surface. Accordingly, also in that regard, the present invention is an improvement on the prior art.

In summary, the present invention improves upon the prior art and is different from the aforementioned disclosures in that it provides an oil dispensing nozzle which is not subject to clogging, it dispenses a stream of oil which is not subject to deflection by centrifugal force, and the nozzle can be aimed. In those three regards, the present invention provides an improved oil lubrication system for thrust bearings.

Still further, it is known in the art that even where the thrust bearing is flooded with oil, such as in the earlier patents mentioned above, there is a churning action on the oil which precludes the oil from being fully effective in reaching the friction surfaces, and thus the bearing is not properly lubricated. Because of that problem, the resort to the nozzle or jet principle was deemed to be a solution, but that presented the other problems mentioned above, all of which are solved by the present invention.

Other objects and advantages will become apparent upon reading the following description in light of the accompanying drawings.

BRIEF DESCRIPTION OF THE DRAWINGS

FIG. 3 is an enlarged sectional view of a portion of FIG. 2 and with the view taken along the line 3—3 of FIG. 4.

FIG. 4 is a sectional view taken along the line 4—4 of FIG. 3.

DETAILED DESCRIPTION OF THE PREFERRED EMBODIMENT

Figure 2:
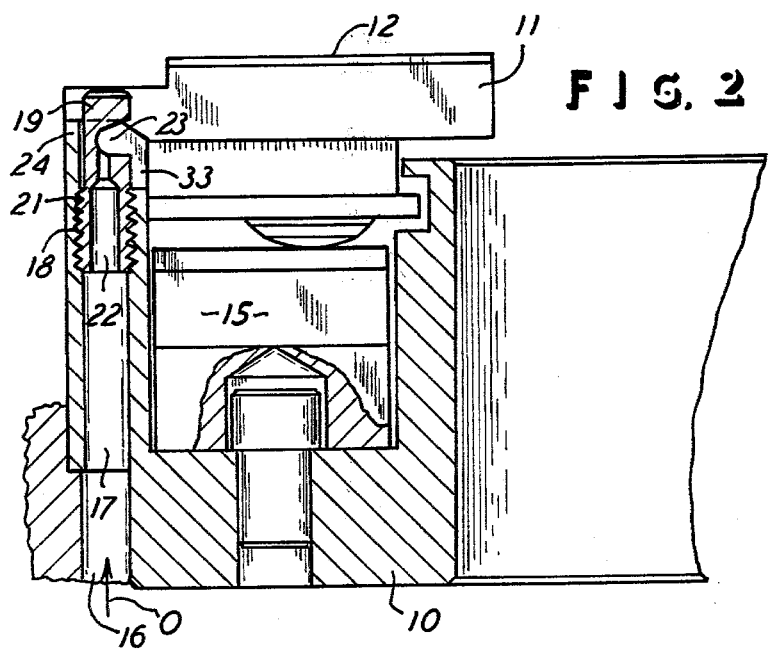
FIG. 2 is a sectional view taken along the line 2—2 of FIG. 1.

The lubrication system of this invention is for a conventional type of thrust bearing, such as that shown in U.S. Pat. No. 3,893,737 which is made a part of this disclosure by reference hereto. Thus, the bearing consists of the usual annular bearing ring 10 which is shown in FIG. 2 to be of a generally U-shaped in cross section and which supports the various parts of the bearing. A plurality of bearing pads 11 are held captured by the ring 10, such as shown in FIG. 2, and it will be seen and understood that the pads 11 are spaced apart and extend circumferentially around the ring 10 and present a friction surface 12 which may be considered to be faced upwardly. Also, self-equalizing links or members 15 are retained by the ring 10 and support the self-adjusting pads 11, all in the conventional arrangement and as will be readily understood by anyone skilled in the art.

Figure 1:
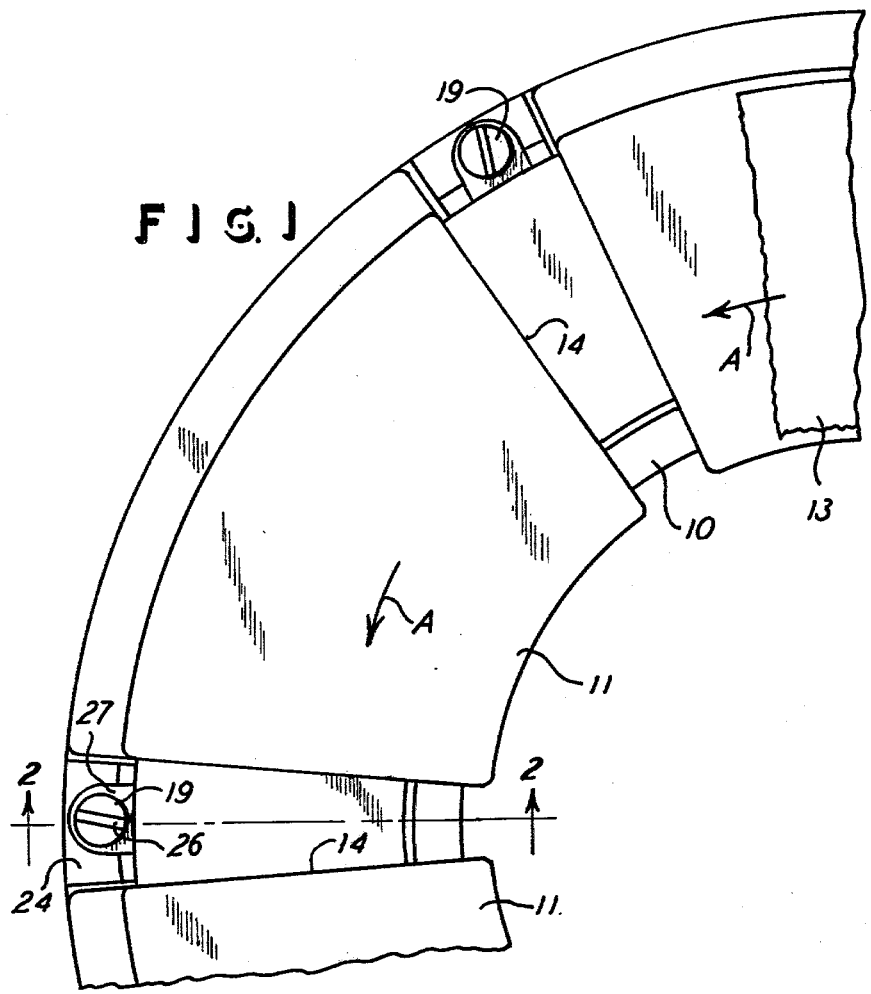
FIG. 1 is a top plan view of a fragment of a thrust bearing incorporating the lubrication system of this invention.

A rotating collar 13 is frictionally supported on the pads 11 and it presents a friction surface in sliding contact with the pad surface 12. It is of course the concern of this invention to lubricate between the friction surface of the collar 13 and the pad friction surface 12. The collar 13 can be considered to be attached as a part of a rotating shaft which is not shown, and the collar can be considered to be rotating in the direction of the arrow A of FIG. 1. Thus, the collar 13 is rotationally progressive toward the pad side or edge designated 14, and it is at that location that it is desired that the lubricating oil be applied.

Also as disclosed in U.S. Pat. No. 3,893,737, the bearing has an oil passageway 16 which receives oil under pressure flowing in the direction of the arrow designated 0, and this enters the passageway 17 formed in the outer edge of the ring 10. A threaded opening 18 is also formed in the outer edge of the ring 10, and there are a plurality of threaded openings 18 spaced apart around the ring 10. An oil dispensing nozzle 19 is disposed in each of the threaded openings 18, and thus the nozzles 19 are also spaced apart around the outer circumference of the ring 10, as indicated with the two nozzles 19 shown on the fragment of the bearing in FIG. 1. The nozzles 19 have one end 21 formed with threads which are engaged in the ring threaded openings 18, so that the nozzles 19 can be secured and positioned in the openings 18. Also, the nozzles 19 have an oil passageway 22 which is in flow communication with the ring oil passageway 17, and the nozzle passageway 22 has an oil outlet opening 23 at the end of the nozzle opposite from its threaded end 21, as shown.

It will be seen and understood that the arrangement is such that the ring 10 has a circular portion 24 which extends axially of the longitudinal or center axis of the ring 10, and the nozzle 19 is thus disposed substantially within the confines of the ring portion 24 and is actually of course embedded in the ring 10. That arrangement is a desired relationship between the nozzle 19 and the ring 10, and a screwdriver slot 26 is provided in the upper end of the nozzle 19 so that the nozzle can be positioned in the threaded opening 18 and can actually be aligned therein in a manner described later.

The drawings therefore show that the nozzle 19 has a single oil passageway 22 which extends through the nozzle 19 and has the single oil outlet 23, rather than a plurality of necessarily smaller outlets which would be required if there were more than one outlet 23. With that plurality of outlets, the tendency for nozzle clogging is a problem, and also the centrifugal force and even the churning action on the oil ejected through the nozzle 19 are problems also. The extending or upstanding ring portion 24 exists between every two pads 11 and thus assists in the positioning of the pads 11 and prevents the pads 11 from being in direct contact with the nozzles 19 which are embedded in the openings 27 in the upstanding portion 24, as shown.

The drawings further show that the nozzle outlet 23 extends through one side 28 of the nozzle 19 and extends for that complete nozzle side 28. That is, the outlet 23 is formed by removing the cross-sectional half of the nozzle 19 to present the outlet 23. Thus the outlet 23 is defined by the three walls or sides 29, 31, and 32. It will be seen that the side 29 is perpendicular to the longitudinal or center axis of the nozzle 19, and that is the axis along the length of the passageway 22, and the wall 31 is arcuate, and the wall 32 is oblique to the nozzle longitudinal axis. In operation, the oil coming through the passageway 22 is under the usual oil pressure which can be created in the usual manner and it follows the path of the arrow designated B in FIG. 3 and the oil is deflected off the oblique but planar wall 32 and thus is ejected from the nozzle 19 in the direction of the arrow designated C in FIG. 3. That is, the oil is ejected slightly upwardly from the nozzle 19, in the orientation of the drawings shown, and it is directly radially inwardly of the ring 10 and thus toward the friction surfaces of the collar 13 and the pads 11.

The arrangement of the nozzle 19 in such that there is only the single oil passageway 22 and the single oil outlet 23, and the oil is directed from the nozzle 19 in a desired directional or aligned relationship, according to the rotated position of each nozzle 19 in the ring 10. That is, the screwdriver slot 26 in the nozzle 19 is aligned with the direction of the nozzle outlet 23, and thus it can be readily established and determined where the direction of the outlet 23 is located. In that manner, the nozzles 19 can be positioned to have the outlet 23 face toward the pad edge 14 which is the progressive edge with respect to the rotation of the collar 13, and thus the desired oil application and film can be applied at that point and thereby overcome the problem of centrifugal force deflecting the oil away from the point of desired application and also overcome the problem of churning, as well as the problem of clogging which exists when there are a plurality of necessarily smaller outlets in an oil nozzle.

In that arrangement, the surfaces 31 and 32 defining the outlet 23 are directed obliquely of the longitudinal axis of the nozzle threads 21 and they present a deflective surface which is oblique to the nozzle longitudinal axis or threads 21 so that the oil outlet is aimed at the friction surface of the collar 13, as mentioned. Further, as best shown in FIGS. 3 and 4, the cross-sectional size of the outlet 23, as displayed in FIG. 4 particularly, is greater than the cross-sectional size of the remainder of the nozzle oil passageway 22, and the outlet 23 is an opening of a 180 degree angle on a plane transverse to the longitudinal axis of the nozzle 19, as also shown in FIGS. 3 and 4. That is, the outlet 23 is at an intermediate location along the length of nozzle 19, and it is not on the end where the screwdriver slot 26 is located. The outlet 23 extends around the cylindrically-shaped nozzle 19 for a complete one-half of the nozzle side 28, all for assuring a substantial size stream of oil flowing from the nozzle 19 and also assuring the nonclogging and directional advantages with respect to the nozzle 19. Again, the nozzles 19 are disposed in the recesses 27 in the ring 10, and are thus counter-sunk therein, for protection and optimum positioning for diverting the oil to the friction surfaces mentioned, all in conjunction with the oil flowing along the path designated C.

Also, with this nozzle arrangement, the nozzles can be of oil flow capacities desired, and nozzles with the proper oil flow capacity can be screwed into the ring 10, and they can be interchanged.

Thus, the ring bossess or upstanding portions 24 are disposed in the radially space between the pads 11 and present the recesses 27 with a radially inwardly directed opening 33. The opening 33 is shown to be of sufficient width to permit the directional aiming of the nozzle outlet 23 to the pad edges 14, as mentioned.

What is claimed is:

1. In a lubrication system for a thrust bearing which frictionally supports a rotating collar, a retainer ring having a plurality of circularly spaced apart oil passageways in the outer circumference of said ring and extending co-axially relative to the longitudinal axis of said ring, a plurality of pads spaced apart with one pad between every two said passageways and extending to a plane offset from the plane across the ends of said passageways and being in contact with said collar, the improvement comprising said oil passageways being threaded openings, an oil nozzle having threads on one end and being threaded into each of said passageways and having a single oil passageway extending therethrough to direct oil from said passageways and to said collar, each of said nozzles having its said single passageway terminate in only a single oil outlet directed obliquely of the longitudinal axis of the threads on said nozzle and to one side of said nozzle and toward said collar, said nozzle outlet having deflective surface defining said oil outlet and extending oblique to said nozzle axis and aimed at said collar, and said nozzles having a screw driver slot in the end thereof opposite said one end and with the longitudinal direction of said slot being aligned with said one side of said nozzle for positioning said nozzle on said ring to direct the oil toward the one of said pads which is in the rotationally progressive direction of rotation of said collar and thereby assure optimum distribution of the oil relative to said collar and said pads.

2. The lubrication system as claimed in claim 1, wherein said oil outlet is of a cross-sectional size greater than that of the remainder of said nozzle passageway, and said oil outlet is an opening of a 180 degree angle on a plane transverse to the longitudinal axis of said nozzle.

3. The lubrication system as claimed in claim 1, wherein said oil outlet is at an intermediate location along the length of said nozzle and extends therearound throughout a complete one-half of said one side of said nozzle for assuring non-clogging of said nozzle.

4. The lubrication system as claimed in claim 1, 2, or 3, wherein said ring has a recess contiguous to each of its said oil passageways, and with said nozzles being counter sunk in said recesses and surrounded by the portions of said ring defining said recesses.

5. In a lubrication system for a thrust bearing which frictionally supports a rotating collar, a retainer ring having a plurality of circularly spaced apart oil passageways in the outer circumference of said ring and extending co-axially relative to the longitudinal axis of said ring, a plurality of pads spaced apart with one pad between every two said passageways and extending to a plane offset from the plane across the ends of said passageways and being in contact with said collar, the improvement comprising said ring having upstanding bosses located intermediate said pads and aligned with said oil passageways which are threaded openings, each of said bosses having an opening faced radially inwardly on said ring, and oil nozzle having threads on one end and being threaded into each of said passageways and having an oil passageway extending therethrough to direct oil from said passageways and to said collar, each of said nozzles having its said oil passageway terminate in only an oil outlet directed obliquely of the longitudinal axis of the threads on said nozzle and to one side of said nozzle and toward said collar, and said nozzle oil outlet having a deflective surface defining said oil outlet and extending oblique to said nozzle axis and faced in the direction of said opening of said boss and aimed at said collar.

6. The lubrication system as claimed in claim 5, wherein there is only one said oil outlet for each said nozzle and it is of a cross-sectional size greater than that of the remainder of said nozzle passageway.

* * * * *